United States Patent [19]
Ekwall

[11] Patent Number: 6,002,827
[45] Date of Patent: Dec. 14, 1999

[54] FIBER RETAINER

[75] Inventor: Håkan Ekwall, Tyresö, Sweden

[73] Assignee: Telefonaktiebolaget LM Ericsson, Stockholm, Sweden

[21] Appl. No.: 09/083,424

[22] Filed: May 22, 1998

[30] Foreign Application Priority Data

May 23, 1997 [SE] Sweden ................................ 9701953

[51] Int. Cl.[6] ..................................................... G02B 6/00
[52] U.S. Cl. ........................... 385/135; 385/136; 385/137
[58] Field of Search ............................ 385/134, 135–139, 385/147, 99

[56] References Cited

U.S. PATENT DOCUMENTS 5,546,491  8/1996  Loch ......................................... 385/99

FOREIGN PATENT DOCUMENTS

| | | |
|---|---|---|
| 4006799 | 9/1991 | Germany . |
| 4018226 | 12/1991 | Germany . |
| 4025351 | 2/1992 | Germany . |
| 4031451 | 4/1992 | Germany . |
| 1 129 208 | 5/1989 | Japan . |
| 9103492 | 5/1993 | Sweden . |
| 9401421 | 10/1995 | Sweden . |
| 9300578 | 2/1998 | Sweden . |
| 2 303 223 | 2/1997 | United Kingdom . |

*Primary Examiner*—Phan T. H. Palmer
*Attorney, Agent, or Firm*—Burns, Doane, Swecker & Mathis, L.L.P.

[57] ABSTRACT

A detachable retainer for optical fibers, in particular optical fiber ribbons, is intended to be used in welding operations. The retainer generally has the structure of a rectangular block having lids that can be swung up and down and are arranged at the top side of the block for clamping the optical fibers. On the underside of the retainer a cylindrical recess is provided, along the transversal diameter of which a more shallow groove is provided which extends up to the longitudinal sides of the retainer. The corresponding flat surface, where the retainer is to be placed, has a cylindrical, short projection or boss having an upper edge with a large bevel and a transversal pin or transversal rib. The pin or rib has a close or tight fit to the corresponding groove in the underside of the retainer whereas the boss and the cylindrical recess have a fit with a considerable play. This results in that the retainer can be easily placed at its position by the boss and the cylindrical recess guiding the retainer to an approximate position and then a more accurate position in the longitudinal direction is obtained, when the pin or the is rib enters the groove. A limited movability is obtained in the lateral direction, which can be required in the case where the optical fibers are to be fitted into stationary V-grooves.

7 Claims, 5 Drawing Sheets

FIBER RETAINER

The present invention relates to a fiber retainer for retaining a simple optical fiber or in particular a plurality of optical fibers, either a plurality of individual fibers or a plurality of fibers composed to a fiber ribbon, in particular in connection with cutting and splicing fibers or fiber ribbons.

BACKGROUND

When handling optical fibers intended for telecommunication in connection with splicing the fibers movable retainers are used, which generally have the shape of low rectangular blocks including lids, which securely clamps the fiber or fibers. The retainer including inserted fibers is placed in a more or less accurate way in the machines or devices used, such as in a fiber welding machine on movable blocks, see for example Swedish patent application 9300578-3, which discloses a fiber welding device for fiber ribbons, such as when removing a protective sleeve and cutting optical fibers, see Swedish patent application 9103492-6, which discloses a combined stripping and cutting device for optical fibers, and when simultaneously handling a plurality of individual optical fibers placed in parallel, see Swedish patent application 9401421-4, which discloses a fiber organizer to be used when welding a plurality of optical fibers to for example the fibers of a fiber ribbon.

An optical fiber ribbon comprises a plurality of optical fibers placed at each other, isolated from each other and from the surroundings, but in some way secured in parallel at each other, e.g. by a polymer sleeve. The number of fibers, which in this way are mounted in parallel to each other, is arbitrary but fiber ribbons comprising 4 parallel fibers, so called 4 fiber ribbons, and 6, 8 fiber and 12 fiber ribbons comprising 6, 8 or 12 parallel optical fibers respectively which are retained at each other are commercially used.

In the prior art typically a loose or movable fiber retainer can be attached in a somewhat more or less definite position on a movable block, which is moved in all three coordinate directions for alignment in the welding operation. V-grooves and other devices having surfaces located in angles to each other can alternatively be used in order to accurately position the ends of the optical fibers in lateral and/or height directions and then also high requirements are posed on an accurate rigid positioning of the fiber retainer in height and lateral directions.

However, such alignment can without large problems be achieved for simple fibers owing to the fact that optical standard fibers usually have the same exterior diameter of about 250 $\mu$m. In the published British patent application No. 2 303 223 for example a device is disclosed for welding optical PM fibers having stationary surfaces which are intended for a fine-positioning and are located in right angles to each other, in which device a retainer is placed accurately in height and lateral directions by bringing it, by means of magnetic forces, to engage with a fixed longitudinal projecting rib on a horizontal base surface.

However, the width of fiber ribbons present variations and differ between different brands, whereas the height from the bottom side of the fiber ribbon to the centre axis of the optical fibers included in the fiber ribbon only present insignificant variations. A loose retainer intended to be capable of being used when welding different types of fiber ribbons must therefore be capable of being displaced laterally on a fixed base surface in order that the ends of the optical fibers, which has been rid of primary and secondary protective enclosures, i.e. from the individual polymer sleeves, which surround and isolate each fiber individually, and the material or the sleeve respectively, which keeps the fibers coated with a primary coating together to form a fiber ribbon, will be capable of extending, as straight as possible, from the retainer to and through the fixedly arranged V-grooves or in any case without any bending laterally and most preferably always without any S-shaped bending in this region.

A simple small bending upwards, so that the fiber ends are still always located in a vertical plane extending from the retainer to the V-grooves, in order that the fibers by their own elasticity will remain in the V-grooves can be allowed, see the above-cited Swedish patent application 9300578-3. It must also be possible to adjust the position of the retainer by a parallel displacement, i.e. so that the retainer maintains the same angular position during the displacement and thus is not rotated, neither around a horizontal or a vertical axis.

Furthermore, it should for this case also be possible to secure such a retainer laterally in a suitable selected position, after having placed the optical fibers included in the fiber ribbon as straight as possible from the retainer to the fine alignment means having the shape of the V-grooves. The fiber ribbon must be firmly retained in the selected position laterally during the fine positioning in the longitudinal direction of the fiber ribbon, which is always necessary in order that the end surfaces of the individual opposite fibers will come in contact with each other and which is made by the displacing the blocks, on which the retainers are secured, in this direction, see the cited Swedish patent application 9300578-3.

The Japanese patent application No. 1-129 208 discloses a loose fiber retainer or jig 1, which can be placed in a fiber welding device and be clamped in it by means of clamping means 2. The German patent document No. 40 18 226 discloses a device for positioning optical fibers in connection with a welding operation. The published German patent application No. 40 06 799 is concerned with welding two groups of optical fibers to each other and discloses a retainer means and its attachment to a base. The published German patent application No. 40 25 351 also deals with welding two groups of optical fibers using a retainer.

SUMMARY

It is an object of the invention to provide a portable or loose retainer for optical fiber ribbons, which in a splicing operation such as welding can be used for varying kinds of fiber ribbons and for fiber ribbons of different brands.

It is another object of the invention to provide a portable or loose retainer for fiber ribbons, which has such a design that the retainer can be displaced laterally without loosing its angular or rotational position.

It is another object of the invention to provide a movable or loose retainer for fiber ribbons, which can be manually displaced in parallel directions and be locked in a selected position.

The problem solved by the invention is to provide a fiber retainer for fiber ribbons, which has the same general exterior shape or design as conventionally used retainers for one or a plurality of fibers or a fiber ribbon and which allows a controlled parallel displacement or a displacement in a horizontal direction perpendicular to inserted fibers without displacing the retainer in the height direction or in a direction parallel to the longitudinal direction of the inserted fibers. Such a retainer allows that fiber ribbons comprising the same number of fibers and having different widths from different manufacturers can be used in the same retainer for a splicing operation.

A loose retainer for optical fibers, in particular for optical fiber ribbons, can be placed in different devices such as preferably welding devices. The retainer generally has the shape of a rectangular block having a lid hinged at its top surface. The lid can be swung or folded upwards and downwards, i.e. opened or closed, for clamping the optical fibers in the down-folded or closed position. On the bottom or under surface of the retainer a cylindrical recess is provided, along the transverse diameter of which a more shallow recess or groove or a more shallow groove is located. The groove extends out to the longitudinal side surfaces of the retainer. A corresponding flat surface of some base block, on which the retainer is to be placed, has a cylindrical short projection or boss having a well bevelled upper edge and a transverse pin or rib. The pin or rib has a good or tight or in the preferred case a very tight fit to the corresponding groove in the under side of the retainer, whereas the boss and the cylindrical recess has a fit including a considerable play. This results in that the retainer can be easily put on its position, by the fact that the boss and the cylindrical recess cooperate to guide the retainer to an approximate position. Then the retainer obtains a more accurate position, when the pin or rib penetrates into the groove. A restricted possibility of a lateral movement is obtained, which makes it possible that the ends of the optical fibers can be adjusted to fit into stationary V-grooves, without subjecting the portions of the fibers between the retainer and the V-grooves to any extra or unnecessary bends.

Generally thus, the retainer has a recess in its bottom surface and at least one groove, which extends in the transverse direction of the retainer from the recess. The recess is intended to cooperate with a boss on a support surface, on which the retainer is intended to be placed, with a loose or a very loose fit and that the groove is intended to cooperate with an elongated pin or rib projecting from the boss laterally or horizontally having a tight or very tight fit to the groove. Thereby the retainer obtains, when it is placed on the support surface, a lateral movability owing to the loose or very loose fit, whereas its angular direction all the time is preserved owing to the tight fit, i.e. so that the retainer can be laterally parallel displaced.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
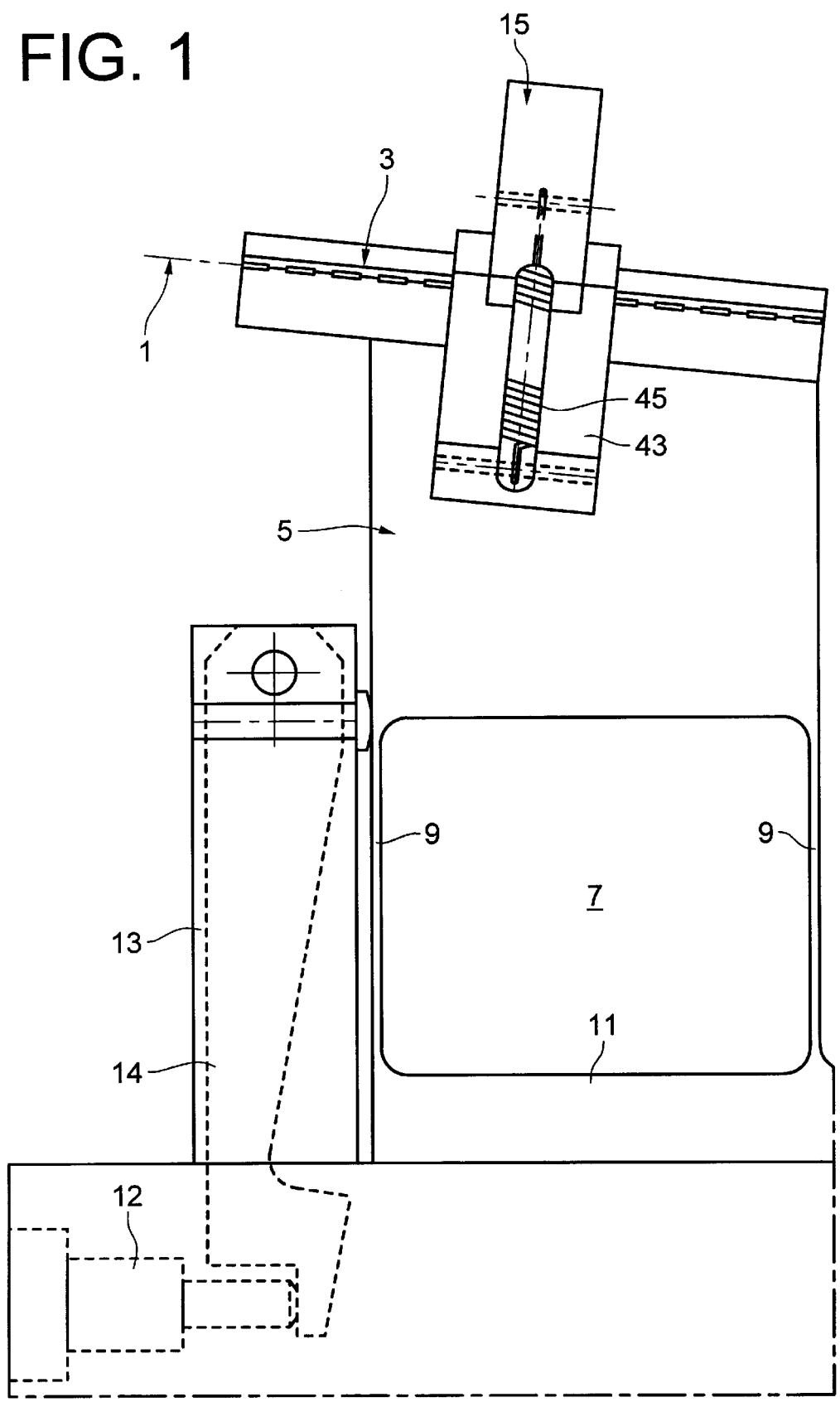
FIG. 1 is a side view of a part of a welding device for fiber ribbons.

In FIG. 1 an optical fiber ribbon 1 is shown, retained in a fiber fixture or retainer 3, which rests on the upper sloping surface of a block 5. The block 5 is the upper horizontal link of a parallelogram formed by cutting a rectangular hole 7 in a whole metal block, so that uniformly thick, thin flexible vertical portions 9 are formed. The thin vertical portions 9 are further links in the parallelogram, which is completed by the lower rigid portion 11 of the metal block. The top block 5 will thereby be displaceable in a horizontal direction by being influenced by a setting motor indicated at 12, arranged in a frame below a vertically projecting part or stand 13, in which the setting motor acts on a lever 14 rotatably mounted in the stand. The displacement mechanism is the general type which is described in the cited Swedish patent application 9300578-3. The fixture 3 is locked in its position by a manually operated blocking device 15.

Figure 2:
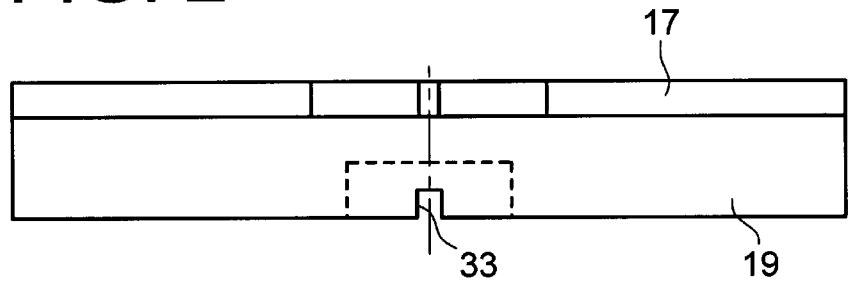
FIG. 2 is a view from the front of a fiber retainer having folded-down lids.
Figure 3:
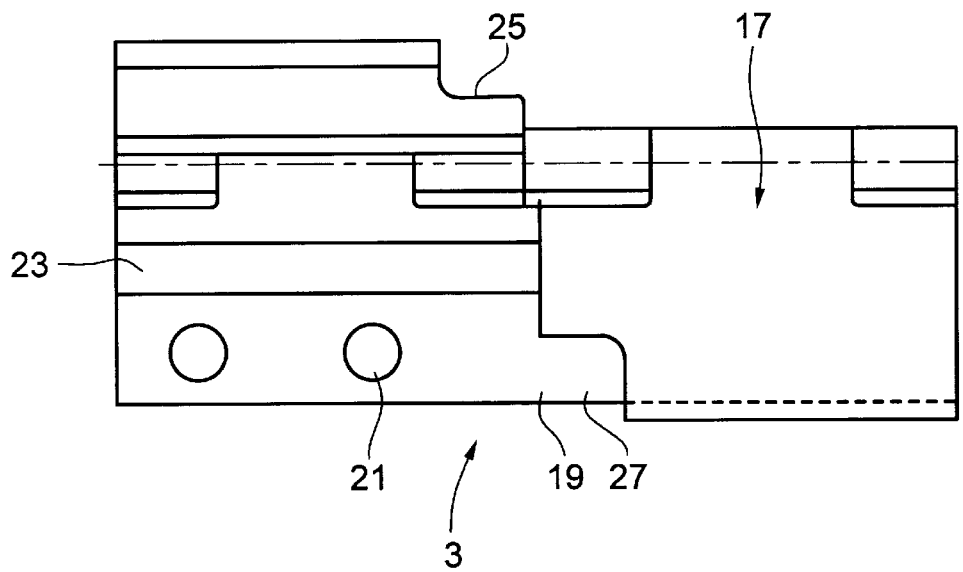
FIG. 3 is a view from above of a fiber retainer having a folded-up lid.
Figure 4:
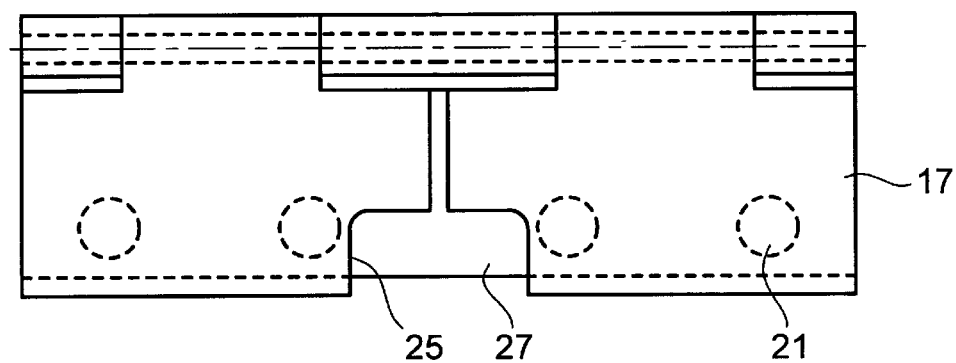
FIG. 4 is a view similar to FIG. 3 but in which the two lids are folded down.
Figure 6:
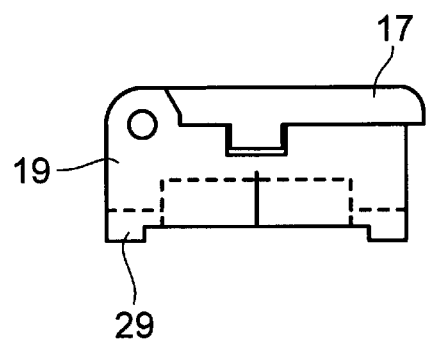
FIG. 6 is a side view of the fiber retainer having its two lids folded down as seen in the longitudinal direction of the retainer.
Figure 7:
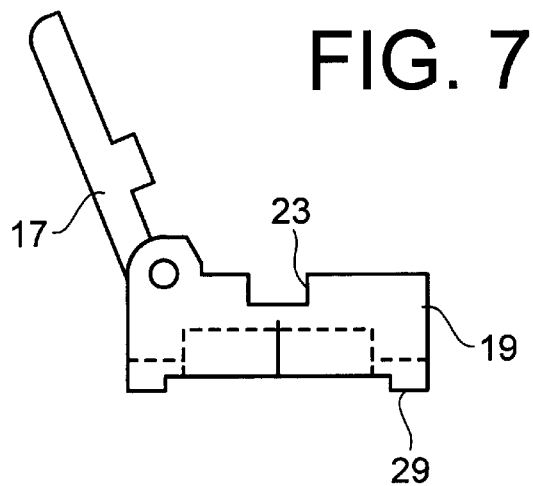
FIG. 7 is a side view similar to FIG. 6 but in which the two lids are folded up.

The fixture 3 is shown as seen from the front in FIG. 2 and from above in FIGS. 3 and 4. It comprises two lid halves 17, which are hinged at the rear edge of the top surface of the base plate 19 of the fixture 3. The lid halves 17 can individually be folded up and down and are in their folded-down position influenced by magnets in order to retain in this position a fiber ribbon, which is to be inserted in the groove 23, see also the side views in FIGS. 6 and 7. The lid halves 17 have at their front edges recesses 25 at the corners, which are located neighbouring each other, so that a free area 27 of the top surface of the base plate 19 is obtained. In this free area 27 the locking device 15 engages when it is folded down to its securing or locking position.

Figure 5:
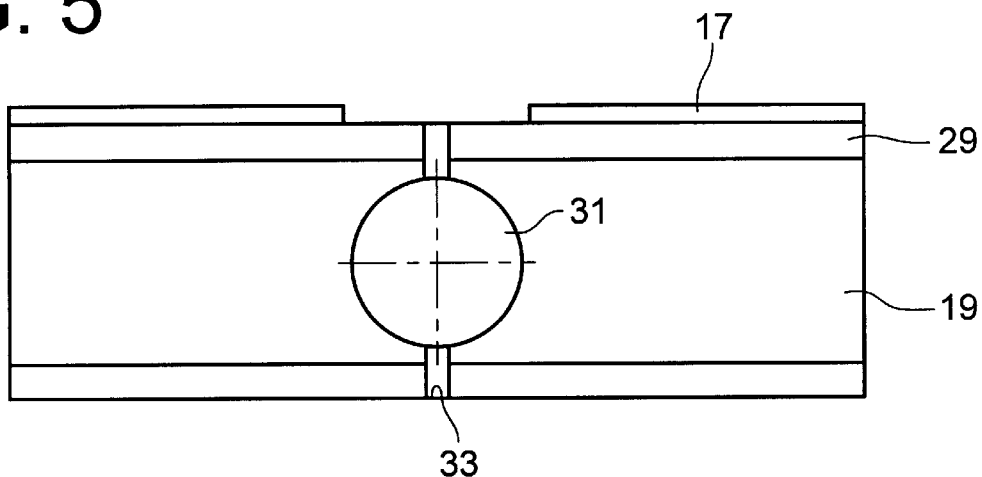
FIG. 5 is a view of the retainer from below.

The base plate 19 has at the front and rear edges of its bottom surface projecting longitudinal ribs 29, with which the fixture 3 rests on the block 5. Between the ribs 29 then a shallow longitudinal rectangular recess is formed, in the centre of which a circular-cylindrical deeper recess is provided. Along the continuation of a transverse diameter of the cylindric central recess 31 more shallow, narrow grooves 33 of uniform width are made, which are aligned with each other and extend towards each side from the central recess up to the longitudinal vertical side surfaces of the base plate 19, where they mouth at the lower edge of these surfaces, see FIG. 2, the view of the bottom side of the fixture in FIG. 5 and the sectional view in FIG. 8.

Figure 8:
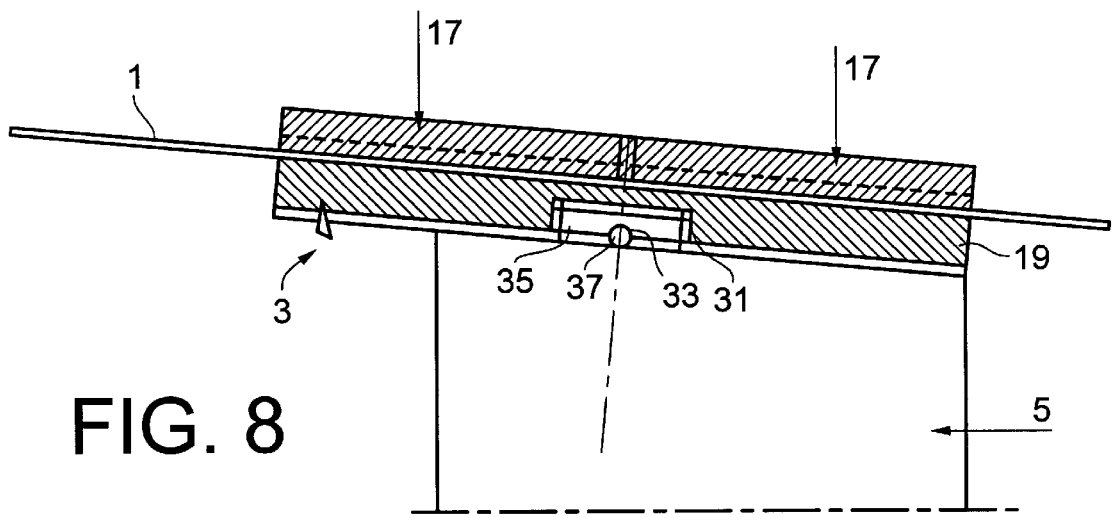
FIG. 8 is a sectional view, the section being taken in the longitudinal direction of the retainer in FIG. 2 placed on a support block.
Figure 9:
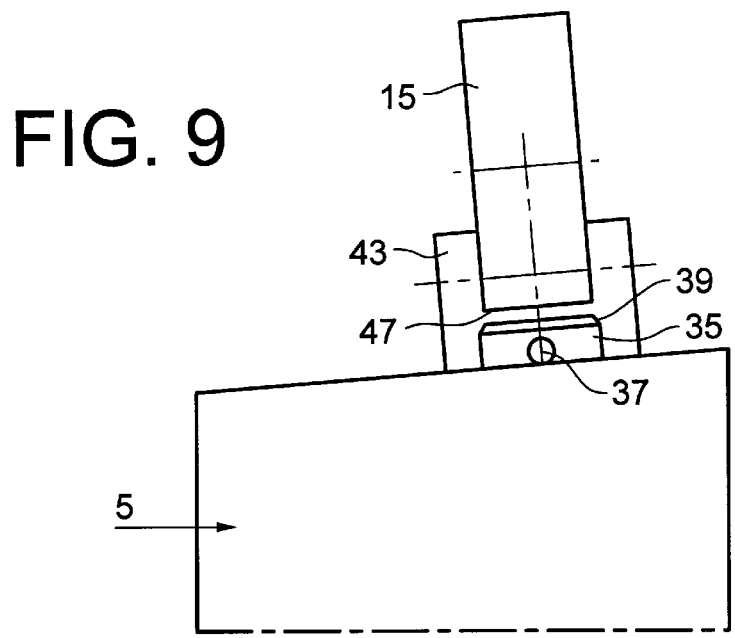
FIG. 9 is a partial view from the side of a support block for the retainer in FIG. 2, in which the support block is seen from an opposite direction compared to FIGS. 1 and 8.
Figure 10:
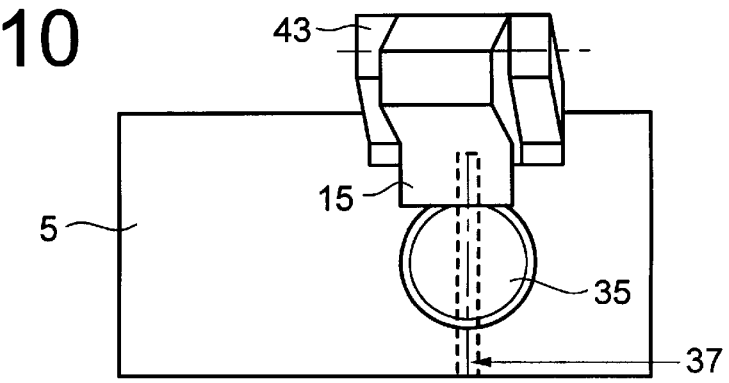
FIG. 10 is a view from above of the support block in FIG. 9, in which the support block has the same orientation.
Figure 11:
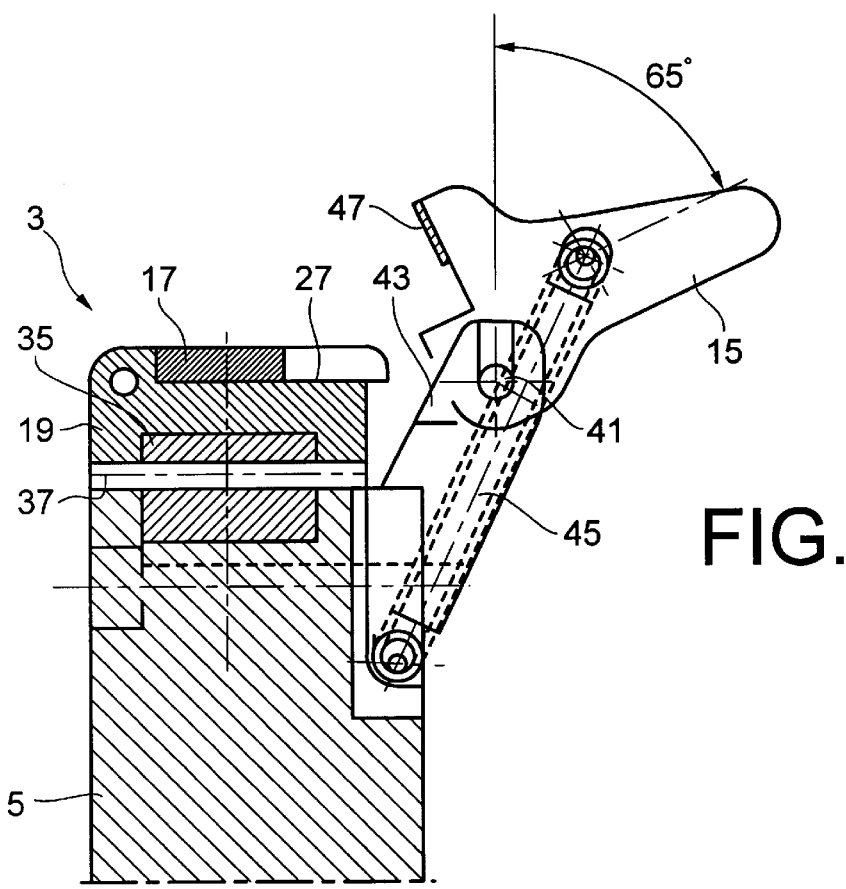
FIG. 11 is a side view in the longitudinal direction along the top surface of the support block comprising a blocking device shown in a folded-out and or folded-up position.
Figure 12:
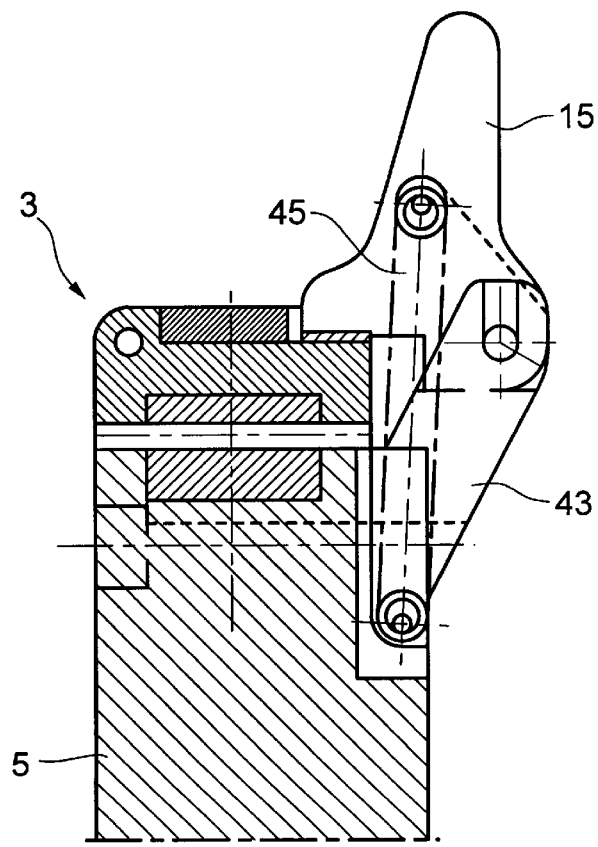
FIG. 12 is a side view similar to FIG. 11 but in which the locking device is in a folded-in or folded-down position.

In FIG. 9, which is seen from an opposite direction compared to FIG. 8, i.e. from the rear side of the device as seen in FIG. 1, the top portion of the block 5 is shown, which on its sloping upper surface has a circular-cylindrical projecting part or boss part 35, which can be the top portion of a low cylindrical dowel attached in a corresponding bore in the top surface, see also FIGS. 11 and 12. A circular-cylindrical pin or peg 37 is attached in a horizontal transverse hole in the projecting boss part 35, so that it is located along a diameter of the boss part 35 and this pin/peg 37 engages the top surface of the support block 5. The projecting part 35 has a short bevel 39 at its upper circular edge. Furthermore, the diameter of the projecting part 35 is somewhat smaller than the diameter of the central recess 31 in the bottom surface of the fixture 3 and its height is somewhat smaller than the depth of the recess, so that the projecting part easily fits into the recess when the fixture 3 is mounted on the support block 5. However, the diameter of the pin 37 is selected, so that the pin has a tight or a good fit to the transverse groove 33 in the bottom surface of the fixture, so that the fixture obtains an accurate angular position, when it is mounted on the support block, whereas it is somewhat movable transversely. The low ribs 29 rest all the time during a lateral adjustment operation on the top surface of the support block 5 and gives the retainer 3 its position in the height direction.

Obviously the pin or peg 37 can be substituted with a narrow rib projecting from the surface of the support block 5, such a rib operating in the same way.

When a lateral position of the fixture 3 has been determined, it is secured in this position by folding the blocking device 15 down, see FIGS. 11 and 12, the blocking device moving in a plane perpendicular to the longitudinal direction of inserted fibers. The locking device 15 is hinged about a shaft 41 at a stationary arm 43, which projects obliquely towards the side, as seen in the longitudinal direction of the inserted fibers, and upwards from the support block 5 at one side thereof. The shaft 41 is parallel to the longitudinal direction of the inserted fibers and thereby to the longitudinal direction of the retainer 3. A helical tension spring 14 is attached both to the lower part of the stationary arm 43 and the locking device 15 at a position above the hinge shaft 41, so that the locking device 15 is bistable, i.e. so that when the locking device is folded down or up respectively, it takes stabile positions and in moving between these positions passes a labile equilibrium position. It is achieved by the fact that in the movement of the locking device between these positions the tension spring 45 passes from a position at a distance from the central line of the shaft 41 through this center line, in which the labile equilibrium position is obtained, to another position at a distance from this central line, the tension spring 45 being most extended in the labile equilibrium. When the locking device 15 is folded down, an engagement surface 14 thereof presses against the always free area 27 on the top surface of the base plate 19 and securely retains the retainer 3 in the position which it then takes, without moving it laterally. For that purpose the geometric axis of the shaft 41 is located in the same plane as the surface, against which its retaining surface is intended to act, i.e. to the top surface of the base plate 19 of the retainer.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A retainer for optical fibers comprising a lid for retaining one optical fiber or a plurality of optical fibers, the retainer being intended to be mounted on a support surface having a projecting part or boss and an elongated pin or rib projecting from the projecting part or boss laterally or horizontally, the retainer comprising a recess in a bottom surface of the retainer and at least one groove, which extends in a transverse direction of the retainer from the recess, for cooperation of the recess with the projecting part or boss with a loose or very loose fit, and for cooperation of the groove with the elongated pin or rib having a tight fit to the groove respectively, whereby the retainer, when mounted on the support surface, is laterally movable in a restricted way owing to the loose or very loose fit, whereas its angular direction all the time is preserved owing to the tight fit.

2. The retainer of claim 1, wherein the recess has a circular-symmetrical shape and the groove is located along an extension or prolongation of a transverse diameter in the circular-symmetrical shape.

3. The retainer of claim 1 further comprising two lids, which are hinged at a rear longitudinal edge of the retainer and which have recesses in the front corners neighbouring each other in order to provide an area at a top surface of the base part, the area being always free independently of the positions of the lids, in order to cooperate with a blocking device for securing the retainer at the support surface.

4. A retainer for optical fibers, the retainer comprising a base part and a lid for retaining one optical fiber or a plurality of optical fibers between the base part and the lid, the retainer further comprising two lids, which both are hinged at a rear longitudinal edge of the retainer and which have recesses in neighbouring front corners in order to provide an area of the top surface of the base part, which is always free independently of the positions of the lids, in order to cooperate with a locking device for securing the retainer.

5. A device for welding optical fibers to each other, the device comprising fiber alignment means and support blocks having support surfaces for receiving loose fiber retainers on the support surfaces, the device further comprising a projecting part or boss projecting from one of the support surfaces and at least one rib or horizontal pin, which extends transversely from the projecting part or boss and which is significantly more narrow than the projecting part or boss, for cooperation of the projecting part or boss and a recess in a bottom surface of a fiber retainer with a loose or wide fit and for cooperation of the at least one rib or horizontal pin and a groove in the bottom surface with a tight or good fit.

6. The device of claim 5, wherein the projecting part or boss has a circular-symmetrical shape and the at least one rib or horizontal pin is located in an extension or prolongation of a transverse diameter in the circular-symmetrical shape.

7. The device of claim 5 further comprising a locking device for securing a retainer at the support surface.

* * * * *